United States Patent [19]

Matsushita

[11] Patent Number: 5,306,424
[45] Date of Patent: Apr. 26, 1994

[54] FUEL FILTER

[75] Inventor: Yoshiharu Matsushita, Ibaraki, Japan

[73] Assignee: Kyosan Denki Kabushiki Kaisha, Tokyo, Japan

[21] Appl. No.: 912,783

[22] Filed: Jul. 13, 1992

[30] Foreign Application Priority Data

Nov. 21, 1991 [JP] Japan .......................... 3-103438[U]

[51] Int. Cl.⁵ ..................... B01D 27/06; B01D 27/08
[52] U.S. Cl. ................... 210/448; 210/450; 210/493.1; 220/614
[58] Field of Search ............... 210/446, 448, 450, 453, 210/493.1, 487, 493.2, 493.5, 452; 55/502, 521; 220/614

[56] References Cited

U.S. PATENT DOCUMENTS

| | | | |
|---|---|---|---|
| 1,876,450 | 9/1932 | Egan et al. | 220/64 |
| 2,955,713 | 10/1960 | Colby | 210/450 |
| 3,071,251 | 1/1963 | Szwargulski | 210/446 |
| 3,235,633 | 2/1966 | Holloway et al. | 55/502 |
| 3,920,746 | 9/1975 | Brandt | 210/448 |
| 4,303,426 | 12/1981 | Battis | 55/502 |

FOREIGN PATENT DOCUMENTS 678486  1/1964  Canada ............................ 210/448

Primary Examiner—Matthew O. Savage
Attorney, Agent, or Firm—Flynn, Thiel, Boutell & Tanis

[57] ABSTRACT

A fuel filter comprises a case having a fuel inlet pipe, a cap having a fuel outlet pipe and a filter element, which is housed in the space defined between the case and the cap, the filter element being formed in zigzag and being of hollow cylindrical shape characterized in that both ends of the filter element are held by flexible elastic bodies which are disposed and compressed between the filter element and the case and between the filter element and the cap.

6 Claims, 3 Drawing Sheets

FUEL FILTER

BACKGROUND OF THE INVENTION

1. Field of the Invention

The present invention relates to a fuel filter to be used in the fuel purifier of the internal combustion engine of an automobile.

2. Prior Art

A conventional fuel filter of this type is illustrated in FIG. 5. The fuel filter comprises a case 22 having a fuel inlet pipe 21, a cap 24 having a fuel outlet pipe 23, and a filter element 25 which is formed in zigzag and of a hollow cylindrical shape. The filter element 25 is adhered to and held by holding plates 26 and 27 by an adhesive 28 at both ends thereof. Outer peripheries of both the case 22 and the cap 24 are rolled in and adhered by the adhesive at a rolled portion 29.

However, the conventional fuel filter has such a problem that a drying process of the adhesive takes time and a filtering area is reduced by the area where the adhesive occupies so that the filter element per se can not be utilized sufficiently since the filter element 25 and the holding plates 26 and 27 are adhered by the adhesive 28. Furthermore, the conventional fuel filter has another problem in that manufacturing cost is high and the supervision thereof is difficult since the drying process of the adhesive takes time and the rolled portion 29 should be compressed during the drying process.

SUMMARY OF THE INVENTION

The present invention has been made in view of the problems set forth above. It is therefore an object of the present invention to provide a fuel filter capable of simplifying a manufacturing process by holding the filter element by a flexible elastic body which is compressed between the filter element and a case and between the filter element and a cap so that the element can be sufficiently utilized as a whole. It is another object of the present invention to provide a fuel filter capable of simplifying a manufacturing process by rolling both ends of the outer peripheries of the case and the cap while a gasket formed of, e.g. rubber is brought into contact with one end of the outer periphery of the case at one surface thereof and is brought into contact with one end of the cap at the other surface thereof. To achieve the above object, the fuel filter according to the present invention is characterized in that both ends of the filter element are sealed and held by an elastic body. The filter is further characterized in that one end of the filter element at the fuel inlet side is held by an elastic body with an outer diameter which is slightly greater than that of the filter element and the elastic body is held by a holding plate disposed between one end of the filter element and the inner periphery of the case and having a cylindrical shape and a bottom and the other end of the filter element at the fuel outlet side is held by an elastic body which is disposed between the other end of the filter element and the inner periphery of the cap. The fuel filter is still further characterized in that a gasket is brought into contact with one end of the outer periphery of the case at one surface thereof and is brought into contact with one end of the cap at the other surface thereof, whereby both ends of outer peripheries of the case and the cap are rolled to form a rolled portion.

With the arrangement of the fuel filter, both ends of the filter element can be sealed and held while compressed by the flexible elastic body without using the adhesive, which involves the simplification of the manufacturing process and sufficient utilization of the filter element. The holding plates can compress the elastic body and further assure the holding of the filter element whereby the fuel passage is formed with assurance.

Further, since both ends of the outer peripheries of the case and the cap can be rolled with ease while a gasket formed of, e.g. rubber is brought into contact with one end of the outer periphery of the case at one surface thereof and is brought into contact with one end of the cap at the other surface thereof without using the adhesive, it is possible to simplify the manufacturing process.

DESCRIPTION OF THE PREFERRED EMBODIMENT

Figure 1:
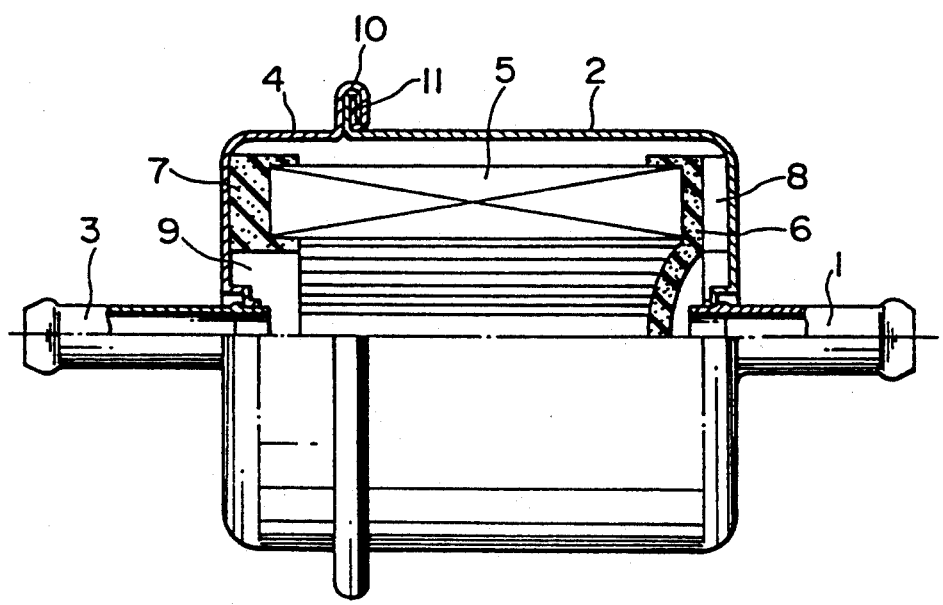
FIG. 1 is a partly cross-sectional view of a fuel filter according to a first embodiment of the present invention.
Figure 4:
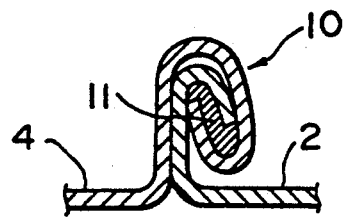
FIG. 4 is an enlarged cross-sectional view of a rolled portion in the fuel filter according to the first and second embodiments of the present invention.
Figure 5:
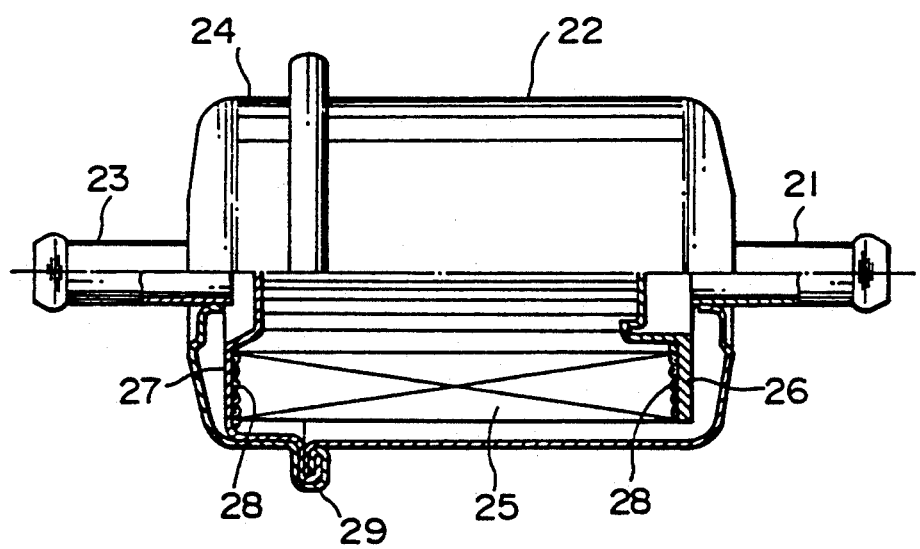
FIG. 5 is a partly cross-sectional view of a conventional fuel filter.

First Embodiment (FIGS. 1 and 4)

A fuel filter according to a first embodiment of the present invention will be described with reference to FIGS. 1 and 4.

The fuel filter comprises a fuel inlet pipe 1 coupled to a case 2 having a flat bottom plate constituting an outer shell of the fuel filter. A fuel outlet pipe 3 is coupled to a cap 4 having a flat bottom plate constituting an outer shell of the fuel filter.

A filter element 5 is formed by bending a plate back and forth into a zigzag formation such that the filter element has zigzag or corrugated folds. The filter elements having zigzag or corrugated folds also is in a hollow tubular shape. The filter element 5 is disposed in the case 2 and covered by the cap 4. Rubber shaped elastic bodies 6 and 7 such as foam rubber are mounted on both ends of the filter element 5. The elastic body 6 is formed of a substantially disc-shaped plate. The elastic body 6 is thin and slightly recessed at the central portion thereof and thick at the circumference thereof. A plurality of grooves 8 are defined on the thick portion and extend in radial directions. When the thick portion of the elastic body 6 is positioned between one end of the filter element 5 and the flat bottom plate of the case 2 so as to be compressed therebetween, it seals and holds one end of the filter element 5. The elastic body 7 is an annular disc having a hole 9 at the central portion thereof and is positioned between the other end of the filter element 5 and a flat bottom plate of the cap 4 so as to be compressed therebetween. As a result, the elastic body 7 seals and holds the other end of the filter element 5. A gasket 11 formed of, e.g. rubber is brought into contact with one end of the outer periphery of the case 2 at one surface thereof and is brought into contact with one end of the cap 4 at the other surface thereof. Successively, both ends of outer peripheries of the case 2 and the cap 4 are rolled to form a rolled portion 10.

With such an arrangement of the fuel filter according to the present invention, the fuel to be filtered, enters from the fuel inlet port 1 into the fuel filter where it is obstructed to advance by the substantially disc-shaped elastic body 6. The fuel passes through the plurality of grooves 8 and is guided into the outer periphery of the filter element 5 in the case 2. The fuel is filtered during passage through the filter element 5 and is purified. The purified fuel passes through the inner periphery of the filter element 5 and the hole 9. Successively, the purified fuel is supplied from the fuel outlet port 3 to a given member such as a carburetor. In this case, both ends of the filter element 5 are not sealed and held by the adhesive but sealed and held by flexible elastic bodies 6 and 7 which are compressed between both ends of the filter element and the flat bottom plates of the case 2 and the cap 4.

In FIG. 4, both ends of the outer peripheries of the case 2 and the cap 4 are not rolled using the adhesive but rolled using a gasket 11 formed of, e.g. rubber, which is brought into contact with one end of the outer periphery of the case 2 at one surface thereof and is brought into contact with one end of the cap 4 at the other surface thereof. Successively, both ends of outer peripheries of the case 2 and the cap 4 are rolled to form a rolled portion 10. The case and the cap each include peripheral flanges having radially innermost portions that continuously abut one another with each said flange including a peripheral edge. An end portion of said case is rolled to form a peripheral trough having an open side facing the wall of the case. An end portion of the flange of the cap is rolled about the edge of the case so as to extend partially within the trough. A side of the edge of the cap contacts the flange of the case at a first point of contact and a side of the edge of the case contacts a rolled portion of the cap at a second point of contact. A space is defined between adjacent portions of the trough and the end portion of the cap and between the points of contact. The gasket is disposed within the space.

Figure 2:
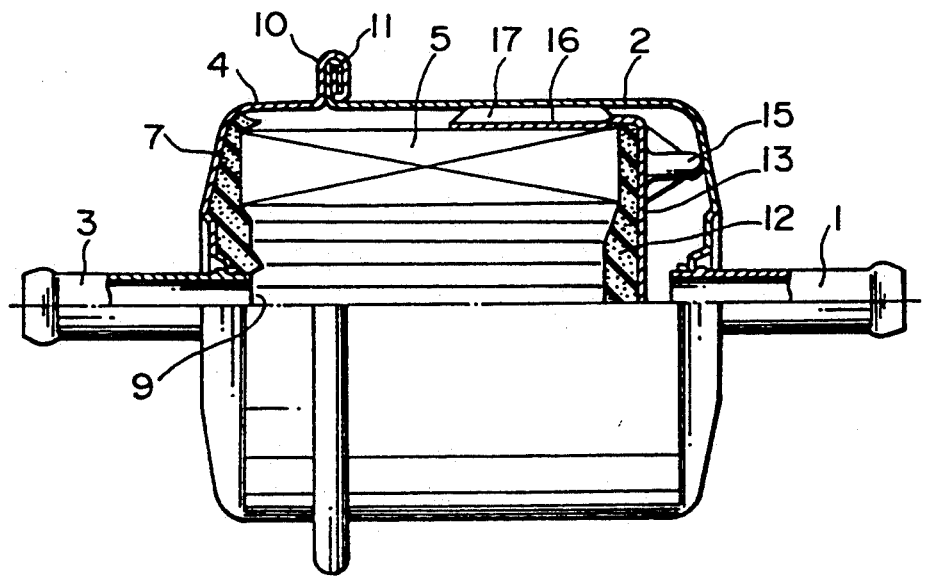
FIG. 2 is a partly cross-sectional view of a fuel filter according to a second embodiment of the present invention.
Figure 3:
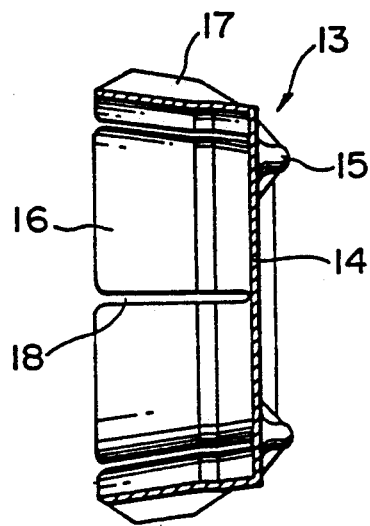
FIG. 3 is a cross-sectional view showing holding plates employed in the fuel filter according to the second embodiment of the present invention.

Second Embodiment (FIGS. 2 to 4)

A fuel filter according to the second embodiment of the present invention will be described with reference to FIGS. 2 to 4. Element which are common to the first embodiment are denoted at the same numerals and the explanations thereof are omitted.

A bypass route is formed at the fuel inlet side 1 between the inner surface of the case 2 and a holding plate 13. The fuel supplied from the fuel inlet 1 passes through the bypass route and enters the filter element 5. The holding plate 13 holds the elastic body 12 and prevents the fuel element 5 from swelling. The elastic body 12 is disc-shaped and has an outer diameter greater than the outer diameter of the filter element 5. When the elastic body 12 is placed and compressed between one end of the filter element 5 and the holding plate 13, it seals and holds one end of the filter element 5.

The bottom plate 14 of the holding plate 13 has a plurality of supporting legs 15 which are arranged in a ring. When the tip ends of the supporting legs are brought into contact with the bottom plate of the case 2, the elastic body 12 is compressed and held by the bottom plate 14. The holding plate 13 has a plurality of cylindrical portions 16 at the outer periphery thereof.

When the cylindrical portions 16 press the outer periphery of the elastic body 12, the outer diameter of the elastic body 12 becomes slightly greater than that of the filter element 5. The cylindrical portions 16 have a plurality of (e.g. six) elastic pressing members 17 which protrude outward the cylindrical portions 16 and also have a plurality of (e.g. six) grooves 18. The supporting legs 15 and the pressing members 17 constitute projection means for providing a spacing between the holding plate and the case and defining a fuel passageway therebetween from the inlet pipe to an outer periphery of the filter element. When the cylindrical portions 16 are mounted between the cylindrical portions of the case 2 and the filter element 5, the cylindrical portions 16 are contracted inside thereof by the elastic pressing member 17, thereby preventing the filter element 5 from swelling outward.

The operation of the rolled portion 10 as illustrated in FIG. 4 is applied to the second embodiment.

What is claimed is:

1. A fuel filter comprising:

a cylindrical case including an end wall at one end thereof and an opposite open end, said end wall having a fuel inlet pipe disposed therein;

a cap having a fuel outlet pipe disposed therein, said cap closing the open end of said case;

a filter element having first and second ends, the filter element being housed in a space defined between the case and the cap, the filter element having zigzag folds and being of a hollow tubular shape;

a first foam rubber elastic body abutting said first end of the filter element, said first foam rubber elastic body having an outer diameter slightly greater than that of the filter element;

a holding plate abutting the first foam rubber elastic body for holding said first foam rubber elastic body against the filter element, said holding plate being disposed between said first end of the filter element and the case, said holding plate including first and second projection means for providing a spacing between said holding plate and said case and for defining a fuel passageway therebetween from said inlet pipe to an outer periphery of said filter element, said holding plate comprising a cylindrical portion and a bottom plate, wherein said first and second projection means are located on said cylindrical portion and said bottom plate, respectively, and said first projection means abut an inner cylindrical surface of said casing and said second projection means abut said end wall and surround said inlet pipe;

a second foam rubber elastic body of of annular configuration sealingly disposed about said outlet pipe and located adjacently between the second end of the filter element and the cap so that fuel passes through the outer periphery of said filter element into a space defined by an inside periphery of said filter element and then out through an opening in the second foam rubber elastic body into said fuel outlet pipe.

2. A fuel filter according to claim 1, wherein said case and said cap each include peripheral flanges having radially innermost portions that continuously abut one another, each said flange including a peripheral edge, wherein an end portion of said case is rolled to form a peripheral trough having an open side facing a wall of said case, wherein an end portion of the flange of said cap is rolled about the edge of said case so as to extend partially within said trough, wherein a side of said edge of said cap contacts the flange of said case at a first point of contact and a side of said edge of said case contacts a rolled portion of said cap at a second point of contact, wherein a space is defined between adjacent portions of said trough and the end portion of said cap and between said points of contact, and wherein a gasket is disposed within said space.

3. A fuel filter according to claim 2, wherein said gasket is of rubber.

4. A fuel filter comprising:
a case having a fuel inlet pipe;
a cap having a fuel outlet pipe, the cap being fitted to the case to define a space therein;
a hollow corrugated tubular filter element housed in the space defined between the case and the cap;
a first foam rubber elastic body disposed and compressed between the filter element and the case for holding and closing off a first end of said filter element as positioned nearest the fuel inlet pipe, said first foam rubber elastic body having an outer diameter slightly greater than that of the filter element;
a holding plate disposed between said foam rubber elastic body and said case for holding said first foam rubber elastic body against the filter element, said holding plate including projection means abutting an interior surface of said case for providing a spacing between said holding plate and said case and defining a fuel passageway from said inlet pipe to an outer periphery of said filter element; and
a second foam rubber elastic body of annular configuration sealingly disposed about said outlet pipe and compressed between the other end of the filter element and the cap such that fuel passes through said outer periphery of said filter element into a space defined by an inside periphery of said filter element and then through an opening in said second foam rubber elastic body and thence out said fuel outlet pipe.

5. A fuel filter according to claim 4, wherein said case and said cap each include peripheral flanges having radially innermost portions that continuously abut one another, each said flange including a peripheral edge, wherein an end portion of said case is rolled to form a peripheral trough having an open side facing a wall of said case, wherein an end portion of the flange of said cap is rolled about the edge of said case so as to extend partially within said trough, wherein a side of said edge of said cap contacts the flange of said case at a first point of contact and a side of said edge of said case contacts a rolled portion of said cap at a second point of contact, wherein a space is defined between adjacent portions of said trough and the end portion of said cap and between said points of contact, and wherein a gasket is disposed within said space.

6. A fuel filter according to claim 5, wherein said gasket is rubber.

* * * * *